2 Sheets--Sheet 1.

J. MATTHEWS.
Apparatus for Dispensing Soda-Water and other Beverages.

No. 141,154. Patented July 22, 1873.

Witnesses:
B. J. Hall
Jas. A. Bell

Inventor:
John Matthews

2 Sheets--Sheet 2.

J. MATTHEWS.
Apparatus for Dispensing Soda-Water and other Beverages.

No. 141,154.      Patented July 22, 1873.

Witnesses:
B. F. Hall
Jas. A. Bell

Inventor:
John Matthews

UNITED STATES PATENT OFFICE.

JOHN MATTHEWS, OF NEW YORK, N. Y.

IMPROVEMENT IN APPARATUS FOR DISPENSING SODA-WATER AND OTHER BEVERAGES.

Specification forming part of Letters Patent No. 141,154, dated July 22, 1873; application filed May 27, 1873.

*To all whom it may concern:*

Be it known that I, JOHN MATTHEWS, of the city, county, and State of New York, have invented certain new and useful Improvements in Apparatus for Dispensing Soda-Water and other Beverages; and I do hereby declare the following to be a full, clear, and exact description of the invention, such as will enable others skilled in the art to which it pertains to make and use it, reference being had to the accompanying drawings, which form part of this specification, in which—

Figure 1:
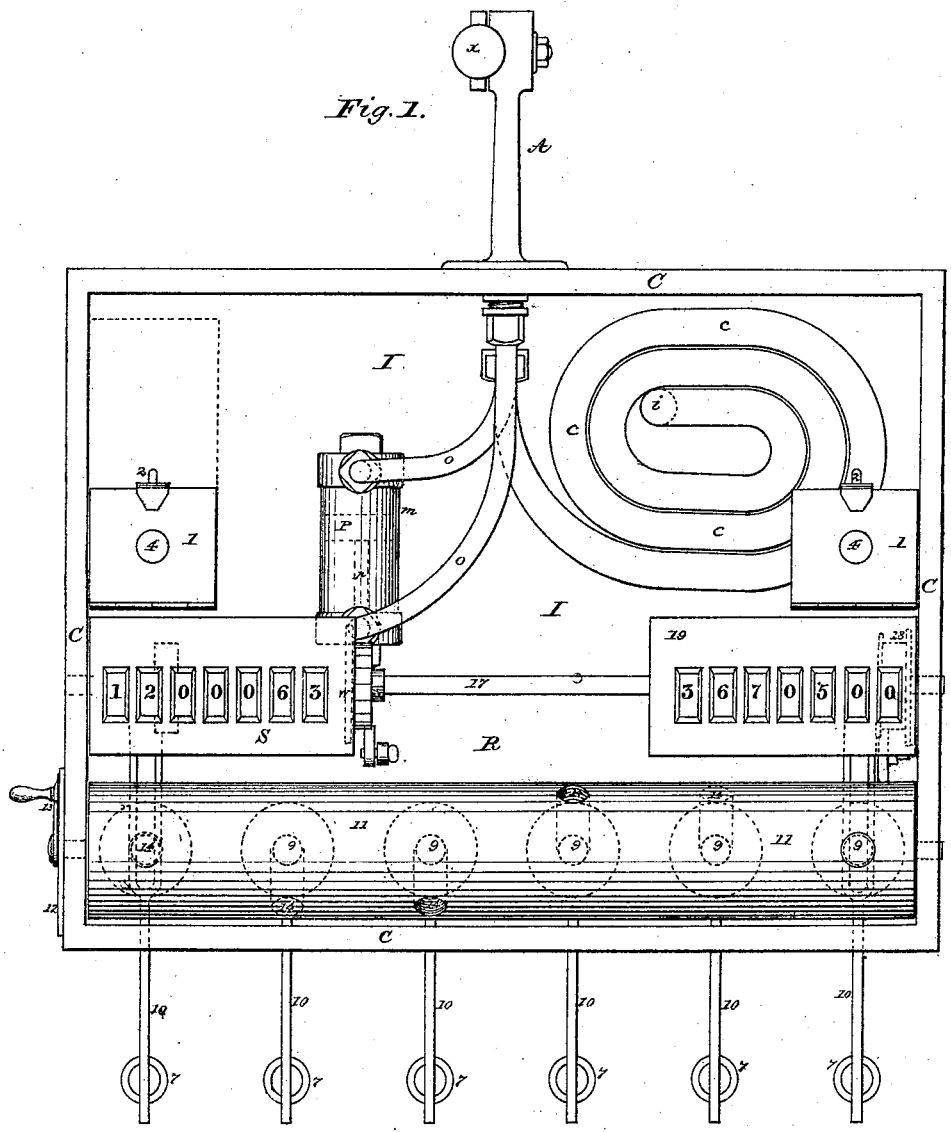
Figure 2:
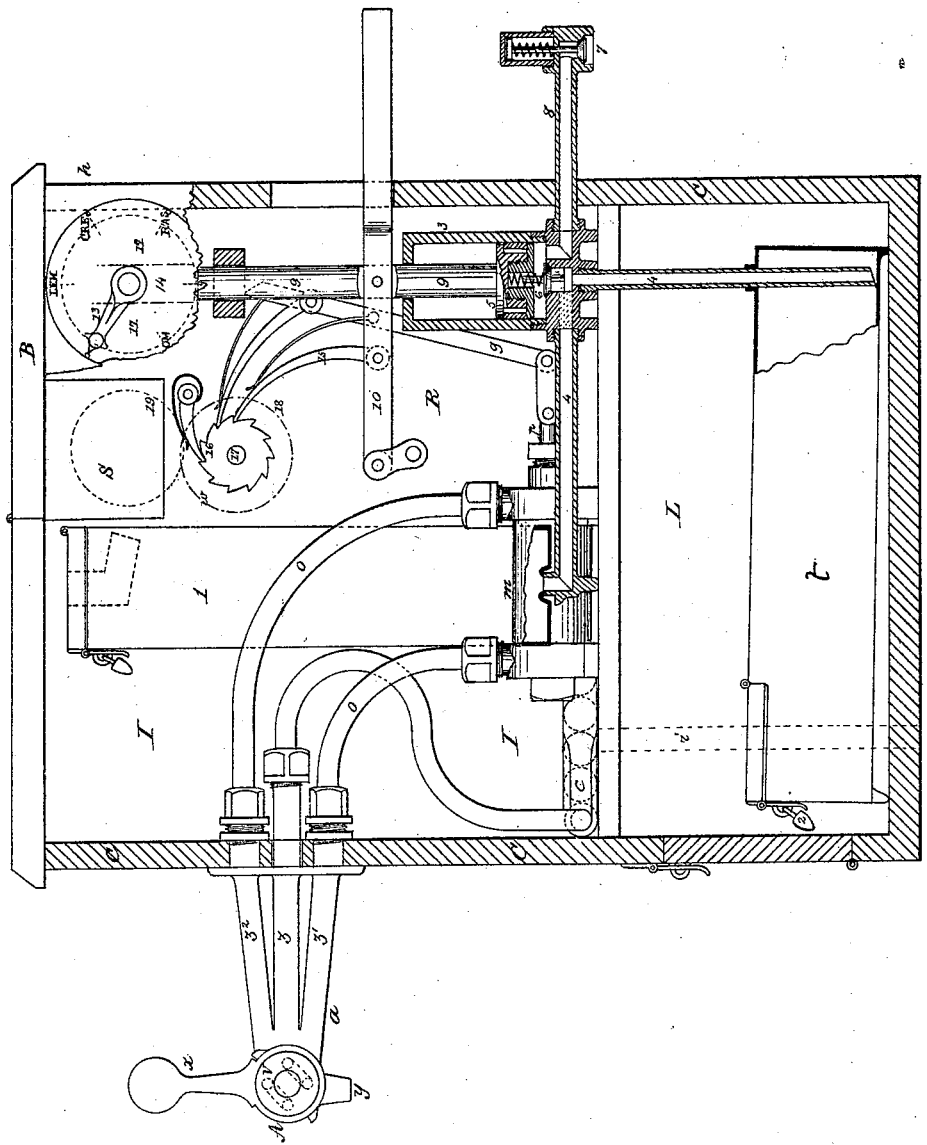

Figure 1 is a plan view, and Fig. 2 a vertical sectional elevation.

This invention constitutes a complete apparatus for dispensing soda-water and other beverages and sirups; and consists of devices for cooling, drawing, measuring, and recording or registering the quantity drawn or dispensed. Certain parts of the invention are also applicable to the bottling of aerated liquids. The improvements relate to devices for drawing soda-water and other beverages and sirups usually employed with such beverages; to means by which the quantity drawn of such is measured, and the number of portions drawn duly recorded and properly summed up and registered; to a novel arrangement of the sirup-tanks and measuring devices in relation to the ice or cooling chamber; and to the combination in one apparatus of means, devices, and instrumentalities whereby the portions of soda-water and sirup are separately drawn, measured, and recorded, so as to keep a check upon both. The invention finally relates to certain adaptations of the before-mentioned parts, whereby stoneware and other opaque bottles may be filled with the required quantity of aerated liquids under pressure, and closed by corks or other stoppers.

The importance of these improvements can scarcely be overestimated. The business of dispensing beverages is already an immense one, and it is still rapidly increasing. There are thousands of places where soda-water, mineral water, and the like drinks are sold, and the amount received annually is reckoned by millions of dollars. As the apparatus is now arranged there is no check upon or means of verifying the accounts rendered by the attendants of such apparatus This sometimes causes unjust suspicion on the part of the proprietors, and sometimes leads to the tempting to dishonesty in the attendants. Both these evils are remedied by this invention. The apparatus itself giving a true and faithful account of its own operation, the attendant has only to keep his account with the same regularity to insure perfect harmony. In many instances this will insure greater profits to the proprietor, and the attendant, even if tempted to dishonesty, will not be likely to yield, or even take the first step aside.

Another advantage of the use of this invention is that, by measuring the portions dispensed, a more equitable distribution is assured; and in cases where the beverage is composed of two distinct portions, as soda-water and sirup, the mixture produced is less variable in flavor, sweetness, and so forth. The beverage can also be dispensed with greater facility, as there is not the same attention required as where the mixture is graduated by the eye and hand of the operator. There is also less danger of overfilling and overflow of the drinking-tumbler, and consequent waste, besides the annoyance of the slop caused upon the dispensing-counter.

The following description will enable those skilled in the art to make and use my invention.

The apparatus consists of an external case of the usual or any suitable form, as taste or convenience may dictate. This case is divided into compartments, as follows: I is the ice-chamber; R, registry-chamber, with door B securely closed by lock $h$; L, lower chamber for sirup-tanks. An air-space, or space to contain non-conducting filling, may be provided between the external case and internal lining. The mode of constructing this, being known, need not be described. $i$, the inlet-pipe by which the aerated or other beverage enters the apparatus from the reservoir, cask, or fountain; $c\ c$, a coil of pipe, serving as a cooler. Any other form of cooler may be substituted. $m\ m$, meter or measuring-chamber, in which the devices for measuring, hereinafter to be described, are contained; $o\ o$, tubes leading from the meter to the draft-arm; A, the draft-arm for drawing off and dispensing the soda-water or other beverage; $x$, lever-arm for operating the reversing-valve; $y$, outlet from which beverage is dispensed; $z$, middle branch of draft-arm; $z^1$, lower branch of draft-arm; $z^2$, upper branch of draft-arm; $v$, valve for reversing current coming from the meter, and for dispensing the beverage; P, piston of the meter, and $p$ piston-rod of the meter; $g$, lever operated by piston of meter; $r$, pawl working on ratchet; $w$, toothed wheel on shaft turned by ratchet; S, counter or register.

The following is a description of sirup department of apparatus: 1 1, sirup-tanks, with covers secured by locks 2 2; 3 3, sirup-pumps or measuring devices, the inlets 4 4 communicating with the sirup-tanks; 5 5, pistons of sirup-pumps; 6 6, inlet-valve of sirup-pumps; 7 7, outlet-valve of sirup-pumps; 8 8, exterior stems of sirup-outlets; 9 9, stems or piston-rods of sirup-measuring devices; 10 10, levers operating sirup-pumps; 11 11, roller for locking sirup-pumps; 12, dial with names of sirups; 13, indicator attached to roller-shaft; 14 14, recesses in roller, into which the stems of sirup-pumps, work; 15 15, pawl attached to lever of sirup-pumps; 16 16, ratchets; 17, ratchet-shaft; 18, toothed wheel operating the counter or register; 19, counter or register.

The aerated or other beverage enters the apparatus by the inlet-pipe $i$, and passes to the cooler $c\ c$ situated within the ice-chamber. From the cooler it passes through the central branch of draft-arm to the reversing-valve, and, returning through the upper branch of the draft-arm, it enters the meter at the head, forcing the piston to the outer end of the cylinder. By moving the lever of the draft-arm one-fourth of a revolution the beverage passes through the central branch into the lower branch, and thence to the front of the meter, forcing the piston to the head of the cylinder, and discharging the water behind the piston through the upper branch of draft-arm, and through the passages of the valve, and issuing from the outlet $y$ into the drinking-tumbler. This movement of the piston operates the lever and moves the ratchet, which turns the toothed wheel operating the counter or register, so that one portion is there recorded. The door of the registry-chamber being unlocked and opened, the number of portions dispensed may be read off on the counter or register on left-hand side of Fig. 1.

The sirup-tanks are closed by a hinged cover with hasp and lock, or equivalent locking device. In the top of each sirup-tank is an angular tube, closed by a plug. This admits the introduction of sirup into the tank, and prevents its abstraction.

I have shown only two sirup-tanks in position in the drawing; but any desirable number of them are placed within the case.

The lock-roller has holes arranged around its circumference in such order that, when the index is turned to the particular sirup which is to be drawn, the hole will be immediately above the stem or piston 9 of the sirup-pump which belongs to that sirup-tank, and thus permits the lever 10, which projects through the slot $c$, to operate the pump which corresponds to that sirup.

The sirup-tanks are usually placed in an upright position, as shown at 1 1, but may be placed in the lower chamber L, as shown at $t$.

The sirup-pumps are especially intended for connection with the registering devices, but are very useful independent of the recording devices, and are, substantially, new in construction and arrangement in a soda-water apparatus.

The sirup-tanks are filled with sirup, and may be locked to prevent access to the sirups, except to admit sirups through the inlets communicating with the angular passages in the covers. If it is desired to dispense a portion of sirup—lemon, for example—the hand or indicator is moved by the operator to the place on the dial marked "Lemon." This brings the recess or hole in the lock-roller in such position over the stem of the pump through which the lemon is dispensed that the lever of that pump can be raised, admitting the sirup into the pump from the sirup-tank. On depressing the lever of the pump the sirup is discharged, through the projecting stem, into the drinking-tumbler, and the stem of the pump withdrawn from the lock-roller, which may then be moved, in the same manner, to discharge another sirup.

It is obvious that the quantity of sirup dispensed will be equal to the capacity of the pump-cylinder or measuring-chamber, and that it may be varied by increasing or diminishing the stroke of the lever, and regulated by the usual stops, or equivalent devices.

The movement of the pump-lever causes the pawl to move the ratchet and shaft carrying the toothed wheel which operates the counter or register, so that one portion is recorded.

I have described and shown a measuring and recording apparatus for the soda-water composed of a cylinder and piston reciprocating therein, something like the cylinder and piston of a steam-engine, the piston being operated by the force of the aerated beverage, being turned, first on one end of the piston and then on the other, by means of the reversing-valve $v$ and lever $x$. But I do not limit myself to this construction, since any other suitable meter may be substituted. A number of suitable meters for the purpose are already known, as water-meters and spirit-meters. One of this kind is that which measures the quantity of liquid which flows through the draft-pipe, and registers the quantity drawn without numbering the portions drawn. When it is desirable to note only the quantity drawn, such a meter, when combined with a soda-water apparatus, constitutes a part of my invention.

I have described two sets of recording devices—one for sirup and one for beverage. That on the left of Fig. 1, showing the numbers 1 2 0 0 0 6 3, is for recording the number of glasses of soda-water drawn, and that on the right with the figures up, 3 6 7 0 5 0 0, is for sirup. I have not particularly described these registering devices, since they are well known, and, separately considered, form no part of my invention. They are made of disks, with numbers running from 0 to 10, similar to what are used on numbering-machines and some of the simpler adding-machines. The shaft moved by the pawl and ratchet moves the units disk or wheel one notch at every movement of the meter-piston or of the sirup-pump. After every revolution of the units-wheel the tens-wheel is moved a notch, and so on to hundreds, thousands, &c., thus keeping a correct record by numbers of every portion of beverage or sirup drawn.

There are many other registering devices known to mechanicians which may be substituted for those mentioned without departing from the nature of my invention.

I have shown a cooler for the soda-water of the coil form; but other forms may be used, and cooling devices may be attached to the sirup-tanks so as to cool the sirup as much as required.

A portion of the advantages of my invention may be obtained by having a measuring and registering device attached to only the soda-water or beverage draft, or to only the sirup department. I prefer, however, to attach measuring and recording devices to both, as described and shown.

Having thus described my invention, what I claim, and desire to secure by Letters Patent of the United States, is—

1. The improved apparatus herein described for dispensing soda-water and other beverages, composed of an external case, a draft apparatus, a meter-chamber, and a cooling-chamber, as described.

2. The combination of a draft apparatus, a measuring apparatus, and recording devices, so as to dispense, measure, and register the number of portions of either soda-water or sirup, or of both, substantially as herein set forth and described.

3. The draft and measuring devices, consisting of the meter $m\ m$, with piston and piston-rod, in combination with the branched draft-arm and reversing-valve, substantially as described.

4. The sirup-tanks arranged with a soda-water apparatus and provided with locking-roller or equivalent means to lock the sirup-pumps, as set forth, either with or without the angular passages, so that the sirup can be withdrawn only through the dispensing apparatus, as described.

5. The combination of the sirup-pumps having projecting outlets, the sirup-tanks, arranged as set forth, with a dispensing apparatus, as described.

6. The combination of the three-branched draft-arm with the reversing-valve, as and for the purpose set forth.

7. The combination of a meter, connecting-passages, and draft-arm, arranged and operated substantially as described.

8. The locking-roller with a dial-plate and containing recesses or holes, arranged, as described, so as to permit the working of any particular sirup-pump, as set forth.

In testimony that I claim the foregoing I have hereunto set my hand this 24th day of May, 1873.

JOHN MATTHEWS.

Witnesses:
B. F. HALL,
JAS. A. BELL.